United States Patent
Lu

(10) Patent No.: US 8,405,938 B2
(45) Date of Patent: Mar. 26, 2013

(54) POWER SUPPLY MODULE

(75) Inventor: Jian-Hui Lu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 527 days.

(21) Appl. No.: 12/723,703

(22) Filed: Mar. 15, 2010

(65) Prior Publication Data
US 2010/0277959 A1    Nov. 4, 2010

(30) Foreign Application Priority Data
Apr. 30, 2009  (CN) .......................... 2009 1 0302019

(51) Int. Cl.
*H02H 7/00* (2006.01)
(52) U.S. Cl. ........................................................ 361/18
(58) Field of Classification Search ....................... 361/18
See application file for complete search history.

(56) References Cited

U.S. PATENT DOCUMENTS

| | | | |
|---|---|---|---|
| 5,029,269 A * | 7/1991 | Elliott et al. ................ | 363/21.1 |
| 5,982,594 A * | 11/1999 | Huczko ........................ | 361/54 |
| 6,094,362 A * | 7/2000 | Domingo ...................... | 363/56.1 |
| 6,650,070 B1 * | 11/2003 | Hudson et al. ................ | 315/312 |
| 6,936,973 B2 * | 8/2005 | Parra et al. .................. | 315/209 R |
| 2002/0130645 A1* | 9/2002 | Tsai et al. .................... | 323/274 |
| 2004/0012986 A1* | 1/2004 | Riggio et al. ................. | 363/26 |

FOREIGN PATENT DOCUMENTS

| CN | 101051743 A | 10/2007 |
|---|---|---|
| TW | 200639611 A | 11/2006 |

* cited by examiner

*Primary Examiner* — Ronald W Leja
(74) *Attorney, Agent, or Firm* — Altis Law Group, Inc.

(57) ABSTRACT

A power supply module includes a rectifying and filtering unit, a pulse width modulation (PWM) unit, a voltage transforming unit, a sampling and comparing unit, and an overvoltage protection unit. The rectifying and filtering unit receives an alternating current (AC) voltage, and generates a filtered primary DC voltage. The PWM unit is configured for generating pulses. The voltage transforming unit transforms the filtered primary DC voltage into the DC voltage according to the pulses. The sampling and comparing unit samples the DC voltage, and generates an overvoltage signal when the sampled DC voltage exceeds a predetermined DC voltage. The overvoltage protection unit is coupled between the sampling and comparing unit and the PWM unit. According to the overvoltage signal, the overvoltage protection unit generates a first control signal to disable the PWM unit, and the overvoltage protection unit is self-locked.

16 Claims, 3 Drawing Sheets

POWER SUPPLY MODULE

BACKGROUND

1. Technical Field

The present disclosure relates to power supplies and, particularly, to a power supply module with overvoltage protection.

2. Description of Related Art

Usually, a power supply module powering a load has an overvoltage protection circuit to protect the load when an output voltage of the power supply module exceeds a predetermined output voltage. The overvoltage protection circuit samples the output voltage of the power supply, compares the sampled output voltage with the predetermined output voltage, and prevents the power supply module from powering the load when the sampled output voltage is larger than the predetermined output voltage. Once the output voltage of the power supply is cut off, the sampled output voltage becomes smaller than the predetermined output voltage. The overvoltage protection circuit allows the power supply to power the load again. Since the power supply is not cut off until overvoltage occurs, the load will suffer overvoltage from time to time, and the service life of the load will be affected.

Therefore, what is needed is to provide a power supply module which can address the problem described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
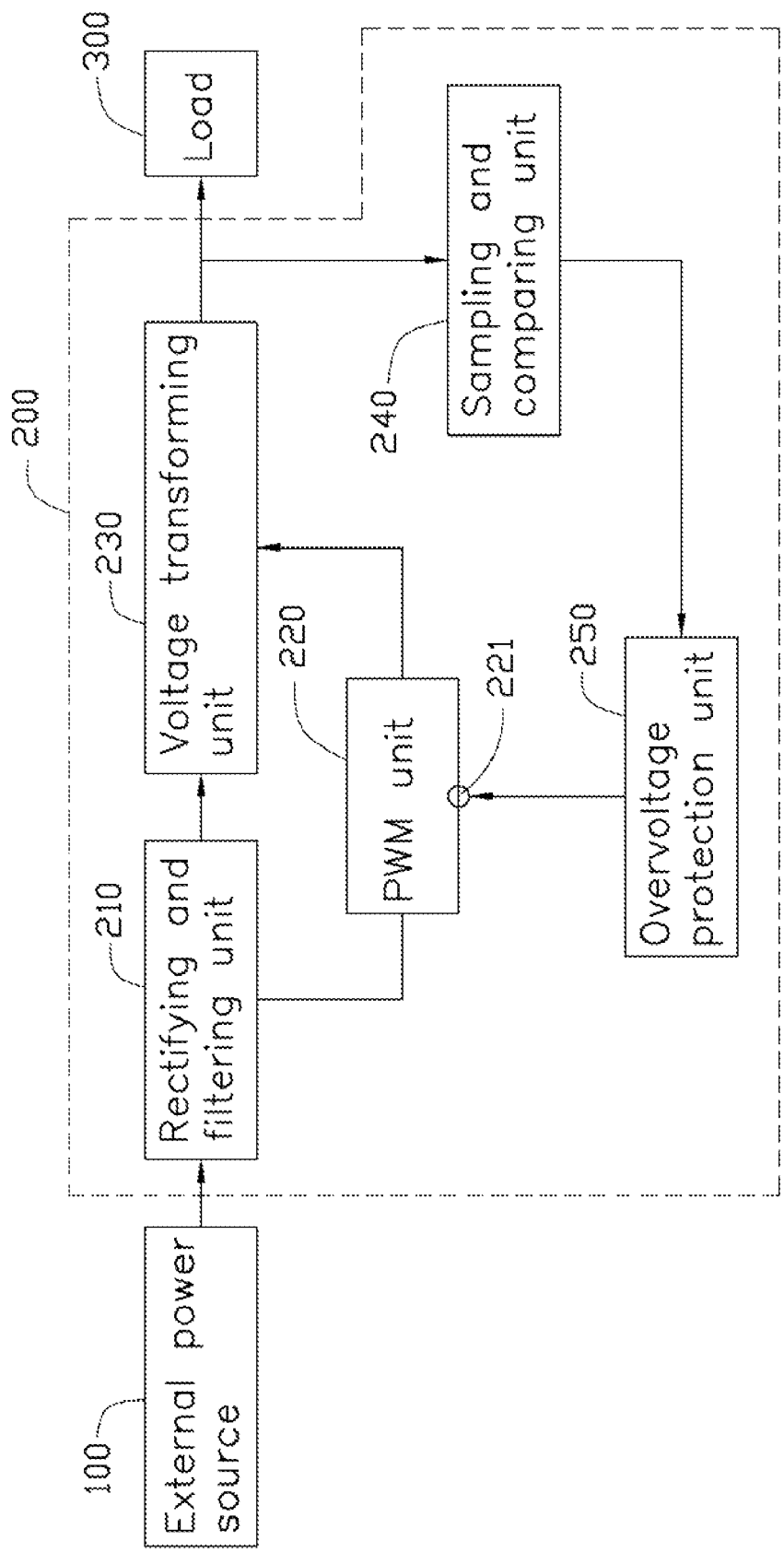
FIG. 1 is a functional block diagram of a power supply module, according to an exemplary embodiment, including an overvoltage protection unit.

Referring to FIG. 1, a power supply module 200 receives electric power from an external power source 100, such as a mains power system, and supplies direct current (DC) to a load 300. The power supply module 200 includes a rectifying and filtering unit 210, a pulse width modulation (PWM) unit 220, a voltage transforming unit 230, a sampling and comparing unit 240, and an overvoltage protection unit 250.

The rectifying and filtering unit 210 is configured for rectifying alternating current (AC) voltage from the external power source 100 into a primary DC voltage and filtering the primary DC voltage. The rectifying and filtering unit 210 includes a bridge rectifier and a low-pass filter circuit.

The voltage transforming unit 230 is configured for receiving the filtered primary DC voltage, and generating a DC voltage when the voltage transforming unit 230 is driven by the PWM unit 220. The DC voltage is supplied to the load 300. In this embodiment, the voltage transforming unit 230 is a transformer (not shown). The voltage transforming unit 230 includes a primary coil and a secondary coil. The primary coil inducts electromotive forces according to the variable current through the secondary coil, and generates the DC voltage accordingly.

The sampling and comparing unit 240 is configured for sampling the DC voltage from the voltage transforming unit 230, and comparing the sampled DC voltage with a predetermined DC voltage. The predetermined DC voltage is stored in the sampling and comparing unit 240 in advance, and can be changed by users. The sampling and comparing unit 240 is further configured for generating an overvoltage signal when the sampled DC voltage exceeds the predetermined DC voltage, and generating a voltage okay signal when the sampled DC voltage falls below the predetermined DC voltage. In this embodiment, the overvoltage signal is a high level signal, and the voltage okay signal is a low level signal.

The PWM unit 220 is powered by the filtered primary DC voltage, and configured for generating pulses to turn on the voltage transforming unit 230. The PWM unit 220 includes a feedback port 221 to receive a first control signal and a second control signal. When the feedback port 221 receives the first control signal, the PWM unit 220 is disabled, when the feedback port 221 receives the second control signal, the PWM unit 220 is enabled.

The overvoltage protection unit 250 is configured for receiving the overvoltage signal, and is self-locked to keep generating the first control signal until the power supply module 200 is reset. The overvoltage protection unit 250 is further configured for receiving the voltage okay signal, and generating a second control signal accordingly. In this embodiment, the first control signal is a low level signal, and the second control signal is a high level signal.

Figure 2:
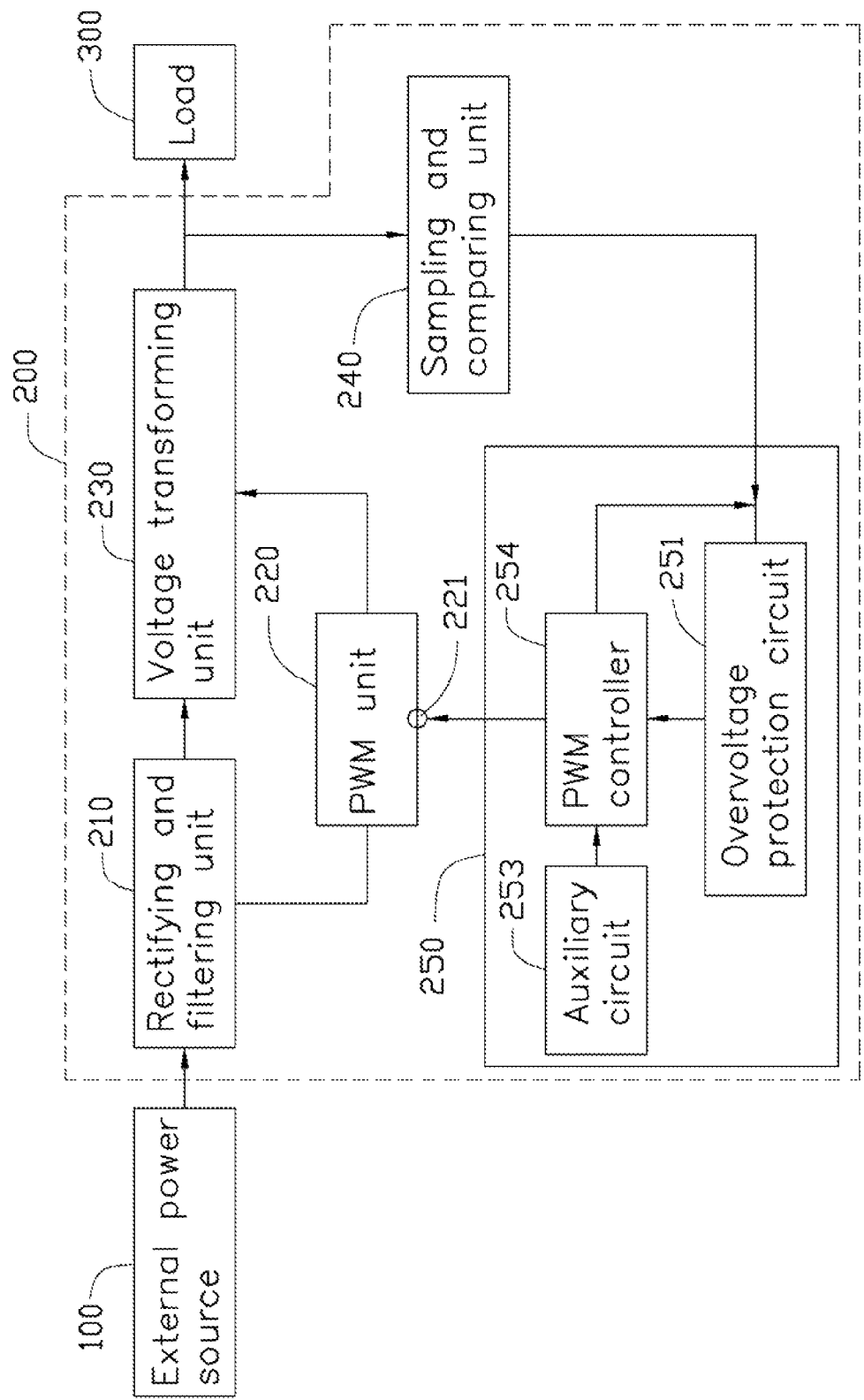
FIG. 2 is a functional block diagram of the power supply module of FIG. 1, wherein a detailed block diagram of the overvoltage protection unit is illustrated.

Further referring to FIG. 2, the overvoltage protection unit 250 includes an overvoltage protection circuit 251, an auxiliary circuit 253, and a PWM controller 254. The auxiliary circuit 253 is configured to supply power to the PWM controller 254. The overvoltage protection circuit 251 is configured for receiving the overvoltage signal, and generating a first driving signal. The PWM controller 254 is powered by the auxiliary circuit 253. The PWM controller 254 is configured for receiving the first driving signal, and generating the first control signal and a locking signal accordingly (see below). The overvoltage protection circuit 251 is further configured for receiving the locking signal, and continuing output of the first driving signal until the power supply module 200 is reset. Meanwhile, the PWM unit 220 remains off. The power supply module 200 should be reset to resume functioning.

The overvoltage protection circuit 251 is further configured for receiving the voltage okay signal, and generating a second driving signal accordingly. The PWM controller 254 is further configured for receiving the second driving signal, and generating the second control signal accordingly.

Figure 3:
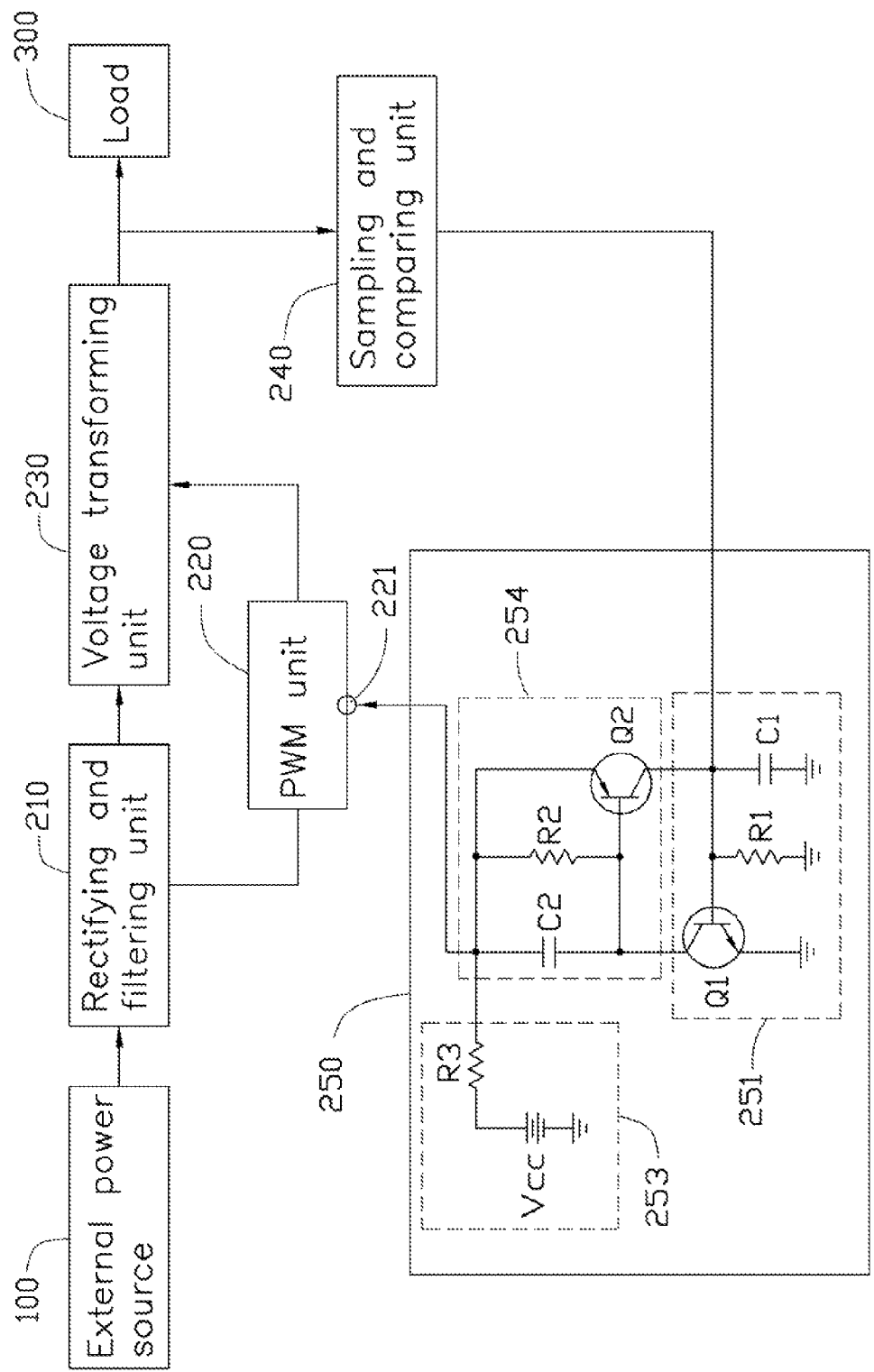
FIG. 3 is a partial circuit diagram of the power supply module of FIG. 1, wherein a detailed circuit diagram of the overvoltage protection unit is illustrated.

Further referring to FIG. 3, in this embodiment, the overvoltage protection circuit 251 includes a first transistor Q1, a first resistor R1, and a first capacitor C1. The first transistor Q1 is a NPN type bipolar junction transistor. The PWM controller 254 includes a second transistor Q2, a second resistor R2, and a second capacitor C2. The second transistor Q2 is a PNP type bipolar junction transistor. The auxiliary circuit 253 includes a power source $V_{CC}$ and a third resistor R3.

An emitter of the first transistor Q1 is electrically grounded. A base of the first transistor Q1 is electrically connected to the sampling and comparing unit 240 for receiving the first/voltage okay signal. A collector of the first transistor Q1 is electrically connected to the base of the second transistor Q2. A collector of the second transistor Q2 is electrically connected to the base of the first transistor Q1. An emitter of the second transistor Q2 is electrically connected to the power source $V_{CC}$ via the third resistor R3. An anode of the power source $V_{CC}$ is electrically connected to the third resistor R3, a cathode of the power source $V_{CC}$ is electrically grounded. One terminal of the first resistor R1 is electrically connected to the base of the first transistor Q1, the other terminal of the first resistor R1 is electrically grounded. One terminal of the first capacitor C1 is electrically connected to the base of the first transistor Q1, the other terminal of the first capacitor C1 is electrically grounded. The second resistor R2 is electrically connected between the emitter and the base of the second transistor Q2. The second capacitor C2 is also electrically connected between the emitter and the base of the second transistor Q2. The emitter of the second transistor Q2 is electrically connected to the feedback port 221 of the PWM unit 220.

The third resistor R3 is configured for controlling current. The first resistor R1 and the first capacitor C1 are configured for dividing and filtering the output of the collector of the second transistor Q2. The second resistor R2 and the second capacitor C2 are configured for dividing and filtering the output of the auxiliary circuit 253. The value of the second resistor R2 is smaller than that of the third resistor R3.

When the sampled DC voltage falls below the predetermined DC voltage, the sampling and comparing unit 240 generates the voltage okay signal (a low level signal). The base of the first transistor Q1 receives the voltage okay signal. The first transistor Q1 is turned off. The second transistor Q2 is turned off. The power source $V_{CC}$ provides a high level signal to the feedback port 221 of the PWM unit 220 via the third resistor R3. Thus, the PWM unit 220 is able to generate pulses for the voltage transforming unit 230 according to the high level signal.

When the sampled DC voltage exceeds the predetermined DC voltage, the sampling and comparing unit 240 generates the overvoltage signal (a high level signal). The base of the first transistor Q1 receives the overvoltage signal. The first transistor Q1 turns on, and the collector voltage of the first transistor Q1 (the base of the second transistor Q2) receives a low level signal. The second transistor Q2 turns on. As the value of the second resistor R2 is smaller than that of the third resistor R3, the emitter of the second transistor Q2 receives a low level signal. Thus, the feedback port 221 of the PWM unit 220 receives the low level signal from the emitter of the second transistor Q2. The PWM unit 220 is disabled to generate pulses for the voltage transforming unit 230 according to the low level signal. Because of the value of the resistance of the first resistor R1, the voltage at the collector of the second transistor Q2 is above zero, and the first transistor Q1 is on. The emitter of the second transistor Q2 output the low level signal to the feedback port 221 of the PWM unit 220, and the power supply module 200 should be reset to work again.

As described, when the emitter of the second transistor Q2 output the low level signal to the feedback port 221 of the PWM unit 220, the PWM unit 220 is locked in a low level state and is disabled, thus cannot generate pulses for the voltage transforming unit 230. The voltage transforming unit 230 cannot be driven to generate the DC voltage. Thus, the load 300 cannot suffer from overvoltage from time to time, and the service life of the load 300 will be improved.

It is to be understood, however, that even though numerous has been described with reference to particular embodiments, but the present disclosure is not limited to the particular embodiments described and exemplified, and the embodiments are capable of considerable variation and modification without departure from the scope of the appended claims.

What is claimed is:

1. A power supply module configured for converting an alternating current (AC) voltage to a direct current (DC) voltage and applying the DC voltage to a load, the power supply module comprising:
   a rectifying and filtering unit configured for rectifying the AC voltage into a primary DC voltage and filtering the primary DC voltage;
   a pulse width modulation (PWM) unit configured for generating pulses;
   a voltage transforming unit configured for transforming the filtered primary DC voltage into the DC voltage according to the pulses;
   a sampling and comparing unit configured for sampling the DC voltage, comparing the sampled DC voltage with a predetermined DC voltage pre-stored in the sampling and comparing unit, and generating comparison result as to whether the sampled DC voltage exceeds the predetermined DC voltage; and
   an overvoltage protection unit coupled between the sampling and comparing unit and the PWM unit;
   wherein the overvoltage protection unit comprises an overvoltage protection circuit and a PWM controller; when the sampled DC voltage exceeds the predetermined DC voltage, the sampling and comparing unit outputs an overvoltage signal to the overvoltage protection circuit, the overvoltage protection circuit generates a first driving signal, the PWM controller generates a first control signal and a locking signal in response to the first driving signal; the overvoltage circuit maintains to generate the first driving signal in response to the locking signal, and the PWM unit is disabled in response to the first control signal, and the overvoltage protection unit is self-locked.

2. The power supply module of claim 1, wherein the overvoltage protection unit comprises:
   an auxiliary circuit configured for powering for the PWM controller.

3. The power supply module of claim 2, wherein the overvoltage protection circuit comprises:
   a first transistor configured for receiving the overvoltage signal and generating the first driving signal;
   a first resistor configured for dividing voltage of the locking signal; and
   a first capacitor configured for filtering the locking signal.

4. The power supply module of claim 3, wherein the PWM controller comprises:
   a second transistor configured for receiving the first driving signal and generating the first control signal and the locking signal accordingly;
   a second resistor configured for dividing voltage of an output of the auxiliary circuit; and
   a second capacitor configured for filtering the output of the auxiliary circuit.

5. The power supply module of claim 4, wherein the auxiliary circuit comprises:
   a power source configured for powering the PWM controller; and
   a third resistor configured for limiting current flowing from the power source, the value of the third resistor is larger than that of the second resistor.

6. The power supply module of claim 3, wherein the PWM unit comprises a feedback port, the PWM unit is further configured for being disabled so as not to generate the pulses when the feedback port receives the first control signal indicating there is an overvoltage.

7. The power supply module of claim 6, wherein an emitter of the first transistor is electrically grounded, a base of the first transistor is electrically connected to the sampling and comparing unit, a collector of the first transistor is electrically connected to a base of the second transistor, the first resistor and the first capacitor are electrically connected between the ground and the base of the first transistor, a collector of the second transistor is electrically connected to the base of the first transistor, a emitter of the second transistor is electrically connected to the feedback port, the second resistor and the second capacitor are electrically connected between the emitter and base of the second transistor, an anode of the power source is electrically connected to the emitter of the second transistor via the third resistor, a cathode of the power source is electrically grounded.

8. The power supply module of claim 7, wherein the first transistor is an NPN type bipolar junction transistor, the second transistor is a PNP type bipolar junction transistor.

9. The power supply module of claim 7, wherein when the sampled DC voltage exceeds the predetermined DC voltage, the first transistor conducts, the collector voltage of the first transistor is a low level signal, the second transistor conducts, as the value of the second resistor is smaller than that of the third resistor, the emitter of the second transistor is a low level signal, the feedback port of the PWM unit receives the low level signal as the first control signal.

10. The power supply module of claim 9, wherein the voltage of the collector of the second transistor maintains the first transistor in an on state.

11. The power supply module of claim 7, wherein the sampling and comparing unit is further configured for generating a voltage okay signal when the power supply module is reset and the sampled DC voltage is below the predetermined DC voltage, the overvoltage protection circuit is further configured for generating a second driving signal according to the voltage okay signal, the PWM controller generates a second control signal in response to the second driving signal; the PWM unit is further configured for being enabled to generate the pulses in response to the second control signal.

12. The power supply module of claim 11, wherein when the sampled DC voltage is below the predetermined DC voltage, the first transistor is turned off, the second transistor is turned off, the power source provides a high level signal to the emitter of the second transistor via the third resistor, the feedback port of the PWM unit receives the high level signal as the second control signal.

13. A power supply module, comprising:
 a rectifying and filtering unit;
 a voltage transforming unit electrically coupled between the rectifying and filtering unit and a load;
 a pulse width modulation (PWM) unit electrically coupled to the voltage transforming unit, the PWM unit comprising a feedback port;
 a sampling and comparing unit electrically coupled to a node formed by the voltage transforming unit and the load; and
 an overvoltage protection unit electrically coupled between the feedback port of the PWM unit and the sampling and comparing unit, the overvoltage protection unit comprising:
  an overvoltage protection circuit electrically coupled to the sampling and comparing unit;
  a PWM controller electrically coupled between the feedback port of the PWM unit and the overvoltage protection circuit, when the PWM controller feeds back to the overvoltage protection circuit, the overvoltage protection unit is self-locked; and
  an auxiliary circuit electrically connected to the PWM controller.

14. The power supply module of claim 13, wherein the overvoltage protection circuit comprises:
 a first transistor, an emitter of the first transistor being electrically grounded, a base of the first transistor electrically connected to the sampling and comparing unit, a collector of the first transistor electrically connected to the PWM controller;
 a first resistor, one terminal of the first resistor being electrically grounded, the other terminal of the first resistor electrically connected to the base of the first transistor; and
 a first capacitor, one terminal of the first capacitor being electrically grounded, the other terminal of the first capacitor electrically connected to the base of the first transistor.

15. The power supply module of claim 14, wherein the PWM controller comprises:
 a second transistor, a base of the second transistor electrically connected to the collector of the first transistor, a collector of the second transistor electrically connected to the base of the first transistor, an emitter of the second transistor electrically connected to the feedback port of the PWM unit;
 a second resistor electrically connected between the emitter and base of the second transistor; and
 a second capacitor electrically connected between the emitter and base of the second transistor.

16. The power supply module of claim 15, wherein the auxiliary circuit comprises:
 a third resistor, one terminal of the third resistor electrically connected to the emitter of the second transistor; and
 a power source, an anode of the power source electrically connected to the other terminal of the third resistor, a cathode of the power source electrically grounded.

* * * * *